(12) United States Patent
Qu

(10) Patent No.: US 11,247,370 B2
(45) Date of Patent: Feb. 15, 2022

(54) METHOD AND APPARATUS FOR BATCHED COMPRESSION MOLDING OF RUBBER AND PLASTIC PRODUCTS

(71) Applicants: South China University of Technology, Guangzhou (CN); Guangzhou Huaxinke Intelligent Manufacturing Technology Co., Ltd., Guangzhou (CN)

(72) Inventor: Jinping Qu, Guangzhou (CN)

(73) Assignees: SOUTH CHINA UNIVERSITY OF TECHNOLOGY; GUANGZHOU HUAXINKE INTELLIGENT MANUFACTURING TECHNOLOGY CO., LTD.

( * ) Notice: Subject to any disclaimer, the term of this patent is extended or adjusted under 35 U.S.C. 154(b) by 593 days.

(21) Appl. No.: 16/339,796

(22) PCT Filed: Jul. 21, 2017

(86) PCT No.: PCT/CN2017/093765
§ 371 (c)(1),
(2) Date: Apr. 5, 2019

(87) PCT Pub. No.: WO2018/095062
PCT Pub. Date: May 31, 2018

(65) Prior Publication Data
US 2020/0039123 A1    Feb. 6, 2020

(30) Foreign Application Priority Data
Nov. 22, 2016    (CN) .......................... 201611035807.4

(51) Int. Cl.
*B29C 43/46*    (2006.01)
*B29C 43/50*    (2006.01)
(Continued)

(52) U.S. Cl.
CPC ............ *B29C 43/361* (2013.01); *B29C 43/10* (2013.01); *B29C 43/50* (2013.01); *B29C 43/58* (2013.01);
(Continued)

(58) Field of Classification Search
CPC ......... B29C 43/08; B29C 43/18; B29C 43/32; B29C 43/34; B29C 2043/181;
(Continued)

(56) References Cited

U.S. PATENT DOCUMENTS 3,457,694 A * 7/1969 Hideo ............... B29C 66/73921
53/477
3,724,257 A * 4/1973 Sims ...................... B21D 53/10
72/324
(Continued)

FOREIGN PATENT DOCUMENTS

CN    102837412 A    12/2012
CN    102862296 A    1/2013
(Continued)

*Primary Examiner* — Joseph S Del Sole
*Assistant Examiner* — Thu Khanh T Nguyen
(74) *Attorney, Agent, or Firm* — The Webb Law Firm

(57) ABSTRACT

Provided is a method and device for batched compression molding of rubber and plastic products by means of multiple mold cavities, including alternating operation of a blank shuttle and a male mold that is in a bottle cap mold, being controlled by means of engagement of two partial gear sets. Mold opening motion, isostatic pressing energy storage, and spring energy storage are implemented by means of the engagement characteristic of the partial gear sets, and mold closing and compression molding are implemented by means of the non-engagement characteristic, isostatic pressing energy storage, and pressurization of the partial gear sets. The method and device effectively resolve the general problem of low production efficiency and poor precision and (Continued)

stability of existing compression molding cap manufacturing equipment.

6 Claims, 2 Drawing Sheets

(51) Int. Cl.
  *B29C 43/36* (2006.01)
  *B29C 43/10* (2006.01)
  *B29C 43/58* (2006.01)
  *B29C 43/32* (2006.01)
  *B29L 31/56* (2006.01)
(52) U.S. Cl.
  CPC .............. *B29C 2043/3283* (2013.01); *B29C 2043/503* (2013.01); *B29C 2043/5833* (2013.01); *B29L 2031/56* (2013.01)
(58) Field of Classification Search
  CPC ........ B29C 2043/3255; B29C 43/3405; B29C 43/3466; B29C 43/3483; B67B 5/032
  See application file for complete search history.

(56) References Cited

U.S. PATENT DOCUMENTS

| | | | | |
|---|---|---|---|---|
| 4,104,845 A | * | 8/1978 | Hoffmann | B67B 5/032 53/297 |
| 5,123,824 A | * | 6/1992 | Alieri | B29C 31/008 264/268 |
| 5,316,460 A | | 5/1994 | Murayama | |
| 6,585,508 B1 | | 7/2003 | Zuffa | |
| 6,718,606 B2 | * | 4/2004 | Bassi | B29C 43/08 425/348 R |
| 7,607,909 B2 | * | 10/2009 | Bergami | B29C 43/08 425/186 |
| 7,628,601 B2 | * | 12/2009 | Rote | B29C 43/08 425/234 |

FOREIGN PATENT DOCUMENTS

| | | |
|---|---|---|
| CN | 105848845 A | 8/2016 |
| CN | 106393537 A | 2/2017 |
| CN | 206264240 U | 6/2017 |
| EP | 0545427 A1 | 6/1993 |

* cited by examiner under the United States national phase of# METHOD AND APPARATUS FOR BATCHED COMPRESSION MOLDING OF RUBBER AND PLASTIC PRODUCTS

CROSS-REFERENCE TO RELATED APPLICATIONS

This application is the United States national phase of International Application No. PCT/CN2017/093765 filed Jul. 21, 2017, and claims priority to Chinese Patent Application No. 201611035807.4 filed Nov. 22, 2016, the disclosures of each of which are hereby incorporated by reference in their entireties.

BACKGROUND OF THE INVENTION

Field of the Invention

The present invention relates to the technical field of rubber and plastic product molding, in particular to a method and device for batched compression molding of rubber and plastic products by means of multiple mold cavities.

Description of Related Art

A bottle cap is an important part of food and beverage packaging. It has the function of keeping the contained product sealed, preventing counterfeit and shoddy products, and ensuring that the contained product is not maliciously damaged. Therefore, the bottle cap is widely used in various bottled products and is a key product for bottle container packaging. The cap manufacturing industry can be thus regarded as the upstream industry of the food and beverage industry, the chemical industry and the pharmaceutical industry, etc., while changes in the demand of the downstream consumer market will directly affect the development of the upstream industry. At present, the food and beverage industry is booming, and the requirements for product packaging are getting higher and higher, which in turn has led to an increasing demand for bottle cap products. In recent years, the production of bottle caps has risen steadily, and so stable and reliable high-efficiency compression molding equipment will have a good application prospect.

Sacmi, an Italian company, is the first mechanical manufacturer to introduce compression molding cap manufacturing equipment to the market and also currently the leader in capping technology. A rotary hydraulic press of Sacmi simplifies the mold, making the investment cost of compression molding much less than that of injection molding. At present, the capping machine produced by the Italian company of Sacmi can produce up to 72,000 caps per hour. A few foreign companies monopolize the manufacturing technology of the compression molding cap manufacturing equipment. Due to various reasons such as mechanical design, engineering materials and production process, there is still a considerable gap between the domestically produced compression molding cap manufacturing equipment and the equipment of the world advanced level. In the domestic market, there are only a few competitive equipment suppliers such as Italian Sacmi. The technical monopoly and no rivals in competition have caused the expensive price of the equipment, while the domestically produced compression molding cap manufacturing equipment generally has problems such as low production efficiency and poor precision and stability, not meeting the current market demand.

Thus, in view of the shortcomings of the existing domestically produced compression molding cap manufacturing equipment, it is of great significance to develop compression molding cap manufacturing equipment with fast cycle, simple structure, stable and reliable operation and high precision for the development and application of the compression molding cap manufacturing technology.

SUMMARY OF THE INVENTION

An object of the present invention is to overcome the deficiencies of the prior art and provide a method for batched compression molding of rubber and plastic products by means of multiple mold cavities, so as to solve the general problem such as low production efficiency and poor precision and stability of the existing compression molding cap manufacturing equipment.

Another object of the present invention is to provide a device for batched compression molding of rubber and plastic products by means of multiple mold cavities for implementing the above method.

A technical solution of the present invention is as follows: A method for batched compression molding of rubber and plastic products by means of multiple mold cavities is provided; according to the method, alternating operation of a blank shuttle and a male mold that is in a bottle cap mold is controlled by means of engagement of two partial gear sets; a gear set in which the tooth profile does not extend uniformly around one or more of the gear wheels, besides, in the engagement process of the two partial gear sets, mold opening motion, isostatic pressing energy storage and spring energy storage are implemented by means of the engagement characteristic of the partial gear sets, and fast mold closing and compression molding are implemented by means of the non-engagement characteristic, isostatic pressing energy storage and pressurization of the partial gear sets.

A three-bar linkage mechanism is disposed between the partial gear set and the blank shuttle, and the partial gear set uses the three-bar linkage mechanism to control the blank shuttle to quickly and synchronously convey a blank to a master mold in the bottle cap mold.

The blank shuttle and the male mold have the same motion period.

The two partial gear sets are externally connected to the same power source.

A device for batched compression molding of rubber and plastic products by means of multiple mold cavities of the present invention for implementing the above method comprises a cable transmission mechanism, a three-bar linkage mechanism, a bottle cap mold, a blank shuttle and a male mold supporting plate.

The cable transmission mechanism comprises two partial gear sets, a mold moving rotary winding wheel, a mold moving cable, a blank conveying rotary winding wheel and a blank conveying cable, and the two partial gear sets comprise a mold moving partial gear set and a blank conveying partial gear set.

The bottle cap mold comprises a male mold and a female mold, a plurality of male molds being evenly distributed on the periphery of the male mold supporting plate, one female mold being arranged under each of the male molds, with one blank shuttle arranged between the male mold and the female mold of each pair.

The mold moving partial gear set and the mold moving rotary winding wheel are connected; the blank conveying partial gear set and the blank conveying rotary winding wheel are connected; one end of the mold moving cable is wound on the mold moving rotary winding wheel, and the other end of the mold moving cable is connected with the male mold supporting plate; one end of a blank conveying cable is wound on the blank conveying rotary winding wheel, and the other end of the blank conveying cable is fixedly connected to a blank conveying cable holder; a plurality of three-bar linkage mechanisms are distributed on the blank conveying cable holder, wherein one end of each of the three-bar linkage mechanisms is connected with the blank conveying cable holder, and the other end of each of the three-bar linkage mechanisms is correspondingly connected with one blank shuttle. Wherein the mold moving partial gear set drives the mold moving rotary winding wheel to rotate, so that the mold moving cable is unwound or wound, thereby driving the male mold to move up or down through the male mold supporting plate to realize mold opening or closing. In the process, the blank conveying partial gear set drives the blank conveying rotary winding wheel to rotate (the mold moving rotary winding wheel and the blank conveying rotary winding wheel alternately operate), so that the blank conveying cable is unwound or wound, thereby driving the blank conveying cable holder to move up or down and driving the blank shuttle through the three-bar linkage mechanism to enter into or exit from the lower part of the male mold. The blank in the blank shuttle is provided by a feeding device located therebelow.

A blank-conveying cable-holder supporting column is arranged in the middle of the blank conveying cable holder, and provided with a blank shuttle supporting frame on the lower periphery, with each of the blank shuttles distributed on the blank shuttle supporting frame; the blank conveying cable holder, the blank-conveying cable-holder supporting column and the blank shuttle supporting frame form a blank conveying cable mechanism. Wherein the blank-conveying cable-holder supporting column is arranged mainly for providing more precise guidance and support for the up and down movement of the blank conveying cable holder, and also for providing guidance and support by using the blank shuttle supporting frame for each of the blank shuttles to enter into or exit from the bottle cap mold.

A linkage bar supporting holder, provided inside with a return spring, is further arranged in the middle of the blank-conveying cable-holder supporting column, and respectively connected with each of the three-bar linkage mechanisms. The setting of the linkage bar supporting holder can make the operation of each of the three-bar linkage mechanisms more stable, so that the blank shuttle can be accurately positioned when feeding.

An ejection plate is arranged in parallel above the male mold supporting plate, and a first mold moving spring is disposed between the ejection plate and the male mold supporting plate. The ejection plate is provided on the outer circumference with a plurality of ejection rods, each of which is correspondingly located on one side of one male mold. The ejection plate and the first mold moving spring are arranged to realize the spring energy storage while the mold is being opened, and meanwhile the ejection plate provides support for each of the ejection rods, so that the ejection rod can quickly eject the bottle cap product when the mold is opened.

A mold moving supporting plate is arranged in parallel above the ejection plate, and a second mold moving spring is arranged between the mold moving supporting plate and the ejection plate. The male mold supporting plate is provided with a compression molding oil cylinder, whose piston passes through the ejection plate to be located in the second mold moving spring. The compression molding oil cylinder is provided at the bottom with a compression molding oil guiding plate and a compression molding switch valve, and a pressure relief oil guiding plate is arranged at the bottom of the compression molding oil guiding plate.

In order to further realize the isostatic pressing energy storage while the mold is being opened, the mold moving supporting plate is provided with an oil tank, and the male mold supporting plate is provided with an energy storage oil cylinder, with the front drive piston of the energy storage oil cylinder passing through the ejection plate to get connected with the oil tank. A pressure relief valve is provided on one side of the energy storage oil cylinder. The energy storage oil cylinder can also be externally connected to a pressurized positioning device through the pressure relief valve. The pressurized positioning device, which has the same specific structure as the existing one in the market, comprises a pressurized positioning bolt, a pressurized positioning spring and a pressurized positioning bolt reset disk, and can be used to control the pressure relief valve to be on/off to limit the front drive piston.

The above-mentioned method and device for batched compression molding of rubber and plastic products by means of multiple mold cavities has the following principle when used for production: When the mold moving partial gear set is engaged, the motor as the power source drives the mold moving rotary winding wheel to rotate, and the mold moving cable pulls the male mold supporting plate up to realize the mold opening and at the same time get the bottle cap products ejected. In the process, the first mold moving spring is compressed to store energy, and the energy storage oil cylinder also stores energy, with the stored energy used for pressurized compression molding and pressure retention during mold closing. When the mold opening is completed, the blank conveying partial gear set is disengaged, and the three-bar linkage mechanism is driven to expand by the blank conveying rotary winding wheel, the blank conveying cable and the blank conveying cable holder, thereby driving the blank shuttle to shuttle out of the bottle cap mold for cutting the blank. Then the blank is blown to the master mold by the gas through a gas conduit inside the blank shuttle, and next the blank shuttle remains stationary until the blank conveying partial gear set is re-engaged. When the partial gear set is re-engaged, the three-bar linkage mechanism retracts to drive the blank shuttle to shuttle into the bottle cap mold. At this time, the mold moving partial gear set is disengaged, the ejection plate and the male mold supporting plate are moved down respectively by the ejecting force of the first mold moving spring and the second mold moving spring to perform mold closing, and the pressure oil flows from the energy storage oil cylinder into the compression molding oil cylinder for pressurized compression molding and pressure retention until the mold moving partial gear set is re-engaged. In the above process, the blank shuttle and the male mold have the same motion period that is generally designed to be 2 s.

The present invention has the following beneficial effects compared to the prior art:

Compared with similar equipment currently imported from abroad, the method and device for batched compression molding of rubber and plastic products by means of multiple mold cavities has lower requirements for equipment manufacturing, but can effectively greatly improve production efficiency and meet the market demand for bottle cap products.

The device for batched compression molding of rubber and plastic products by means of multiple mold cavities controls the male mold to move up and down by the mold moving partial gear set, thereby ensuring the accuracy of opening and closing the mold; with the blank conveyed by the blank conveying partial gear set and the three-bar linkage mechanism, etc., the structure is safe and reliable, and the operation is continuous and stable, which ensure the same motion period of the blank shuttle and the male mold, improve the precision of the bottle cap products and reduce the rejection rate of the products.

The device for batched compression molding of rubber and plastic products by means of multiple mold cavities stores the energy of the motor in an energy storage spring by the displacement of the male mold supporting holder, thereby improving the energy utilization rate, saving energy and being environmentally protective, effectively reducing the production cost, and having a wide range of applications.

The device for batched compression molding of rubber and plastic products by means of multiple mold cavities utilizes the precise positioning characteristics of the mechanical structure to realize time-sharing coordination of blank cutting, cap blank blowing, mold closing, compression molding, mold opening and ejection movement, preventing interference between the mechanical structures during the operation of each process; at the same time, multiple sets of molds are used for parallel compression molding, which effectively improves production efficiency.

Figure 1:
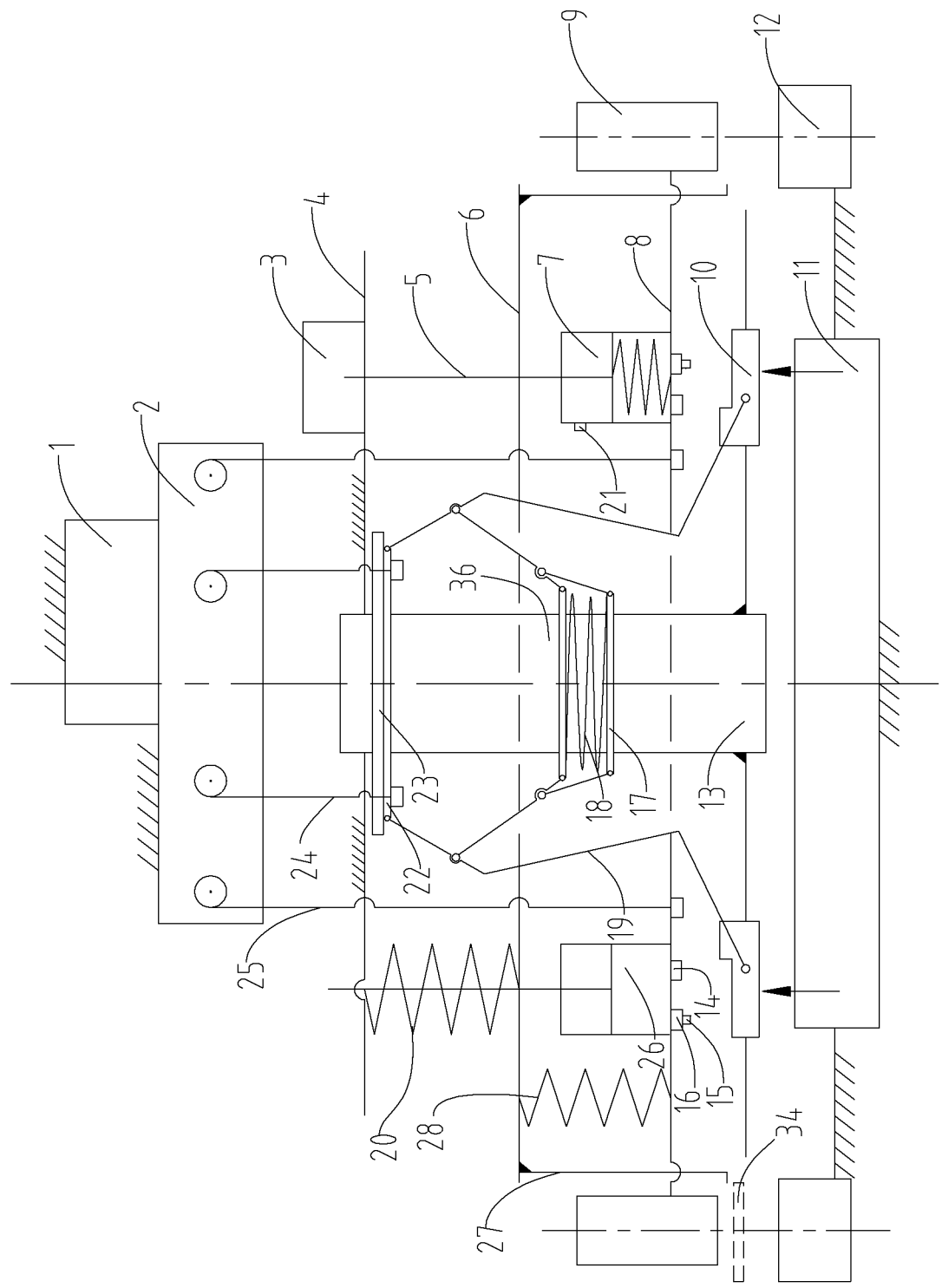
FIG. 1 is a schematic diagram showing the principle of the device for batched compression molding of rubber and plastic products by means of multiple mold cavities.

In the above figures, the components indicated by the reference numerals are as follows: 1. A power source; 2. a cable transmission mechanism; 3. an oil tank; 4. a mold moving supporting plate; 5. a front drive piston; 6. an ejection plate; 7. an energy storage oil cylinder; 8. a male mold supporting plate; 9. a male mold; 10. a blank shuttle; 11. a feeding device; 12. a female mold; 13. a blank shuttle supporting frame; 14. a compression molding switch valve; 15. a pressure relief oil guiding plate; 16. a compression molding oil guiding plate; 17. a linkage bar supporting holder; 18. a return spring; 19. a three-bar linkage mechanism; 20. a second mold moving spring; 21. a pressure relief valve; 22. a linkage bar supporting holder; 23. a blank conveying cable holder; 24. a blank conveying cable; 25. a mold moving cable; 26. a compression molding oil cylinder; 27. an ejection rod; 28. a first mold moving spring; 29. a mold moving partial gear set; 30. a mold moving rotary winding wheel; 31. a blank conveying partial gear set; 32. a blank conveying rotary winding wheel; 33. a spur gear set; 34. a bottle cap product; and 35. a bevel gear set.

DETAILED DESCRIPTION

The present invention will be further described in detail below with reference to the examples, but the embodiments of the present invention are not limited thereto.

Example

A device for batched compression molding of rubber and plastic products by means of multiple mold cavities of this example, as shown in FIG. 1, comprises a cable transmission mechanism 2, a three-bar linkage mechanism 19, a bottle cap mold, a blank shuttle 10 and a male mold supporting plate 8.

Figure 2:
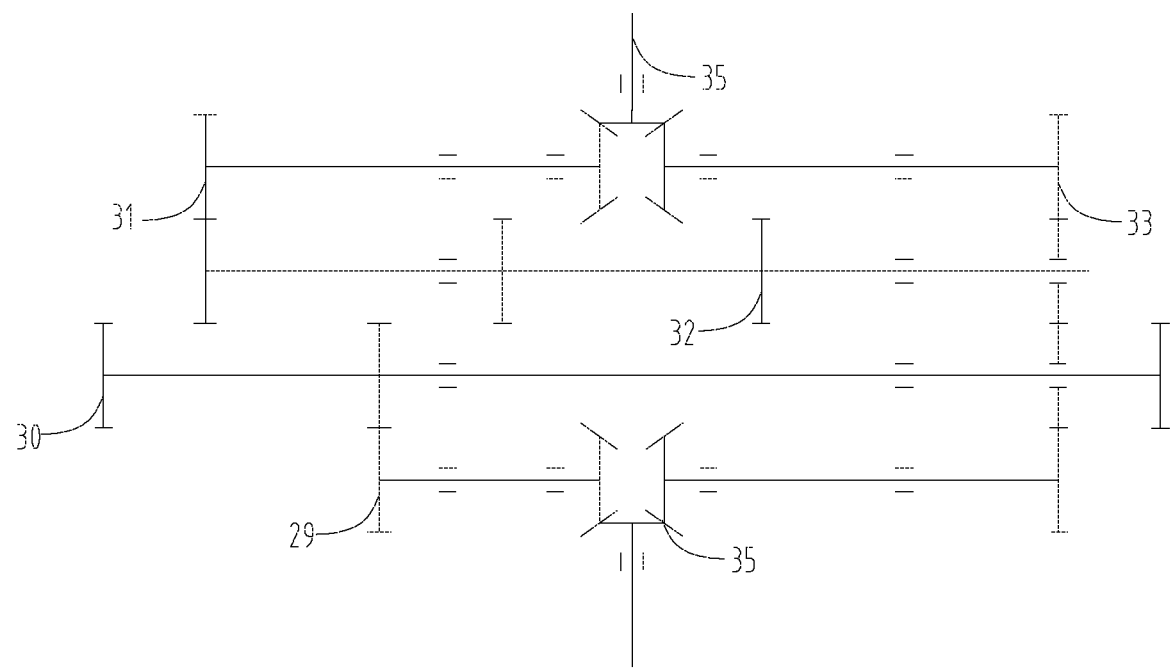
FIG. 2 is a schematic diagram showing the principle of connecting two partial gear sets in the cable transmission mechanism with the mold moving rotary winding wheel and the blank conveying rotary winding wheel.

As shown in FIG. 2, the cable transmission mechanism 2 comprises two partial gear sets 29, 31, a mold moving rotary winding wheel 30, a mold moving cable 25, a blank conveying rotary winding wheel 32 and a blank conveying cable 24, and the two partial gear sets 29, 31 comprise a mold moving partial gear set 29 and a blank conveying partial gear set 31. The bottle cap mold comprises a male mold 9 and a female mold 12, a plurality of male molds 9 being evenly distributed on the periphery of the male mold supporting plate 8, one female mold 12 being arranged under each of the male molds 9, with one blank shuttle 10 arranged between the male mold 9 and the female mold 12 of each pair.

The mold moving partial gear set 29 and the mold moving rotary winding wheel 30 are connected; the blank conveying partial gear set 31 and the blank conveying rotary winding wheel 32 are connected; one end of the mold moving cable 25 is wound on the mold moving rotary winding wheel 30, and the other end of the mold moving cable 25 is connected with the male mold supporting plate 8; one end of the blank conveying cable 24 is wound on the blank conveying rotary winding wheel 32, and the other end of the blank conveying cable 24 is fixedly connected to the blank conveying cable holder 23; a plurality of three-bar linkage mechanisms 19 are distributed on the blank conveying cable holder 23, wherein one end of each of the three-bar linkage mechanisms 19 is connected with the blank conveying cable holder 23, and the other end of each of the three-bar linkage mechanisms 19 is correspondingly connected with one blank shuttle 10. Wherein the mold moving partial gear set 29 drives the mold moving rotary winding wheel 30 to rotate, so that the mold moving cable 25 is unwound or wound, thereby driving the male mold 9 to move up or down through the male mold supporting plate 8 to realize mold opening or closing. In the process, the blank conveying partial gear set 31 drives the blank conveying rotary winding wheel 32 to rotate (the mold moving rotary winding wheel 30 and the blank conveying rotary winding wheel 32 alternately operate), so that the blank conveying cable 24 is unwound or wound, thereby driving the blank conveying cable holder 23 to move up or down and driving the blank shuttle 10 through the three-bar linkage mechanism 19 to enter into or exit from the lower part of the male mold 9. The blank in the blank shuttle 10 is provided by a feeding device 11 located therebelow.

A blank-conveying cable-holder supporting column is arranged in the middle of the blank conveying cable holder 23, and provided with a blank shuttle supporting frame 13 on the lower periphery, with each of the blank shuttles 10 distributed on the blank shuttle supporting frame 13; the blank conveying cable holder 23, the blank-conveying cable-holder supporting column and the blank shuttle supporting frame 13 form a blank conveying cable mechanism. Wherein the blank-conveying cable-holder supporting column is arranged mainly for providing more precise guidance and support for the up and down movement of the blank conveying cable holder 23, and also for providing guidance and support by using the blank shuttle supporting frame 13 for each of the blank shuttles 10 to enter into or exit from the bottle cap mold.

A linkage bar supporting holder 17, provided inside with a return spring 18, is further arranged in the middle of the blank-conveying cable-holder supporting column, and respectively connected with each of the three-bar linkage mechanisms 19. The setting of the linkage bar supporting holder 17 can make the operation of each of the three-bar linkage mechanisms 19 more stable, so that the blank shuttle 10 can be accurately positioned when feeding.

An ejection plate 6 is arranged in parallel above the male mold supporting plate 8, and a first mold moving spring 28 is disposed between the ejection plate 6 and the male mold supporting plate 8. The ejection plate 6 is provided on the outer circumference with a plurality of ejection rods 27, each of which is correspondingly located on one side of one male mold 9. The ejection plate 6 and the first mold moving spring 28 are arranged to realize the spring energy storage while the mold is being opened, and meanwhile the ejection plate 6 provides support for each of the ejection rods 27, so that the ejection rod 27 can quickly eject the bottle cap product 34 when the mold is opened.

A mold moving supporting plate 4 is arranged in parallel above the ejection plate 6, and a second mold moving spring 20 is arranged between the mold moving supporting plate 4 and the ejection plate 6. The male mold supporting plate 8 is provided with a compression molding oil cylinder 26, whose piston passes through the ejection plate 6 to be located in the second mold moving spring 20. The compression molding oil cylinder 26 is provided at the bottom with a compression molding oil guiding plate 16 and a compression molding switch valve 14, and a pressure relief oil guiding plate 15 is arranged at the bottom of the compression molding oil guiding plate 16.

In order to further realize the isostatic pressing energy storage while the mold is being opened, the mold moving supporting plate 4 is also provided with an oil tank 3, and the male mold supporting plate 8 is provided with an energy storage oil cylinder 7, with the front drive piston 5 of the energy storage oil cylinder 7 passing through the ejection plate 6 to get connected with the oil tank 3. A pressure relief valve 21 is provided on one side of the energy storage oil cylinder 7. The energy storage oil cylinder 7 can also be externally connected to a pressurized positioning device through the pressure relief valve 21. The pressurized positioning device, which has the same specific structure as the existing one in the market, comprises a pressurized positioning bolt, a pressurized positioning spring and a pressurized positioning bolt reset disk, and can be used to control the pressure relief valve 21 to be on/off to limit the front drive piston 5.

A method for batched compression molding of rubber and plastic products by means of multiple mold cavities implemented by above device is as follows: According to the method, alternating operation of a blank shuttle 10 and a male mold 9 that is in a bottle cap mold is controlled by means of engagement of two partial gear sets 29, 31; besides, in the engagement process of the two partial gear sets 29, 31, mold opening motion, isostatic pressing energy storage and spring energy storage are implemented by means of the engagement characteristic of the partial gear sets 29, 31, and fast mold closing and compression molding are implemented by means of the non-engagement characteristic, isostatic pressing energy storage and pressurization of the partial gear sets 29, 31. A three-bar linkage mechanism 19 is disposed between the partial gear set 29, 31 and the blank shuttle 10, and the partial gear set 29, 31 uses the three-bar linkage mechanism 19 to control the blank shuttle 10 to quickly and synchronously convey a blank to a master mold in the bottle cap mold. The blank shuttle 10 and the male mold 9 have the same motion period. The two partial gear sets 29, 31 are connected to the same power source 1 through the bevel gear set 35 on one side, and the spur gear set 33 and the bevel gear set 35 on the other side serve as a power transmission unit between the two partial gear sets 29, 31.

The above-mentioned method and device for batched compression molding of rubber and plastic products by means of multiple mold cavities has the following principle when used for production: When the mold moving partial gear set 29, 31 is engaged, the motor as the power source 1 drives the mold moving rotary winding wheel 30 to rotate, and the mold moving cable 25 pulls the male mold supporting plate 8 up to realize the mold opening and at the same time get the bottle cap products 34 ejected. In the process, the first mold moving spring 28 is compressed to store energy, and the energy storage oil cylinder 7 also stores energy, with the stored energy used for pressurized compression molding and pressure retention during mold closing. When the mold opening is completed, the blank conveying partial gear set 31 is disengaged, and the three-bar linkage mechanism 19 is driven to expand by the blank conveying rotary winding wheel 32, the blank conveying cable 24 and the blank conveying cable holder 23, thereby driving the blank shuttle 10 to shuttle out of the bottle cap mold for cutting the blank. Then the blank is blown to the master mold by the gas through a gas conduit inside the blank shuttle 10, and next the blank shuttle 10 remains stationary until the blank conveying partial gear 31 set is re-engaged. When the blank conveying partial gear set 31 is re-engaged, the three-bar linkage mechanism 19 retracts to drive the blank shuttle 10 to shuttle into the bottle cap mold. At this time, the mold moving partial gear set 29 is disengaged, the ejection plate 6 and the male mold supporting plate 8 are moved down respectively by the ejecting force of the first mold moving spring 28 and the second mold moving spring 20 to perform mold closing, and the pressure oil flows from the energy storage oil cylinder 7 into the compression molding oil cylinder 26 for pressurized compression molding and pressure retention until the mold moving partial gear set 29 is re-engaged. In the above process, the blank shuttle 10 and the male mold 9 have the same motion period that is generally designed to be 2 s.

The present invention can be better implemented as described above, and the above example is merely preferred one of the present invention and not intended to limit the scope of the present invention; that is, all equivalent changes and modifications made in accordance with the present invention are covered by the scope as claimed in the claims of the present invention.

The invention claimed is:

1. A device for batched compression molding of rubber and plastic products by means of multiple mold cavities, comprising:
    a cable transmission mechanism comprising two partial gear sets, a mold-moving rotary winding wheel, a mold-moving cable, a blank-conveying rotary winding wheel, and a blank-conveying cable, wherein the two partial gear sets comprise a mold-moving partial gear set and a blank-conveying partial gear set;
    a three-bar linkage mechanism;
    a bottle cap mold comprising a male mold and a female mold;
    a blank shuttle; and
    a male mold supporting plate;
    wherein a plurality of male molds are evenly distributed on a periphery of the male mold supporting plate, one female mold being arranged under each of the plurality of male molds, with one blank shuttle arranged between the male mold and the female mold of each pair, the mold-moving partial gear set and the mold-moving rotary winding wheel are connected, the blank-conveying partial gear set and the blank-conveying rotary winding wheel are connected, one end of the mold-moving cable is wound on the mold-moving rotary winding wheel, and another end of the mold-moving cable is connected with the male mold supporting plate, one end of the blank-conveying cable is wound on the blank-conveying rotary winding wheel, and another end of the blank-conveying cable is fixedly connected to a blank-conveying cable holder, and a plurality of three-bar linkage mechanisms are distributed on the blank-conveying cable holder, wherein one end of each of the plurality of three-bar linkage mechanisms is connected with the blank-conveying cable holder, and another end of each of the plurality of three-bar linkage mechanisms is correspondingly connected with one blank shuttle.

2. The device according to claim 1, wherein a blank-conveying cable-holder supporting column is arranged in a middle of the blank-conveying cable holder and is provided with a blank shuttle supporting frame on a lower periphery, with each blank shuttle distributed on a blank shuttle supporting frame; and wherein the blank-conveying cable holder, the blank-conveying cable-holder supporting column, and the blank shuttle supporting frame form a blank-conveying cable mechanism.

3. The device according to claim 2, wherein a linkage bar supporting holder, provided inside with a return spring, is further arranged in a middle of the blank-conveying cable-holder supporting column and is respectively connected with each of the plurality of three-bar linkage mechanisms.

4. The device according to claim 1, wherein an ejection plate is arranged in parallel above the male mold supporting plate, and a first mold-moving spring is disposed between the ejection plate and the male mold supporting plate; and wherein the ejection plate is provided on an outer circumference with a plurality of ejection rods, each of the plurality of ejection rods being correspondingly located on one side of one male mold.

5. The device according to claim 4, wherein a mold-moving supporting plate is arranged in parallel above the ejection plate, and a second mold-moving spring is arranged between the mold-moving supporting plate and the ejection plate; wherein the male mold supporting plate is provided with a compression molding oil cylinder whose piston passes through the ejection plate to be located in the second mold-moving spring; and wherein the compression molding oil cylinder is provided at a bottom with a compression molding oil guiding plate and a compression molding switch valve, and a pressure relief oil guiding plate is arranged at a bottom of the compression molding oil guiding plate.

6. The device according to claim 5, wherein the mold-moving supporting plate is provided with an oil tank, and the male mold supporting plate is provided with an energy storage oil cylinder, with a front drive piston of the energy storage oil cylinder passing through the ejection plate to be connected with the oil tank; and wherein a pressure relief valve is provided on one side of the energy storage oil cylinder.

\* \* \* \* \*

UNITED STATES PATENT AND TRADEMARK OFFICE
CERTIFICATE OF CORRECTION

| | | |
|---|---|---|
| PATENT NO. | : 11,247,370 B2 | |
| APPLICATION NO. | : 16/339796 | |
| DATED | : February 15, 2022 | |
| INVENTOR(S) | : Jinping Qu | |

It is certified that error appears in the above-identified patent and that said Letters Patent is hereby corrected as shown below:

On the Title Page

Column 1, Assignees, Line 2, after "TECHNOLOGY" insert -- (CN); --

Column 1, Assignees, Line 5, after "LTD." insert -- (CN) --

Signed and Sealed this
Nineteenth Day of April, 2022

Katherine Kelly Vidal
*Director of the United States Patent and Trademark Office*